United States Patent
Dravet et al.

(10) Patent No.: US 8,991,749 B2
(45) Date of Patent: Mar. 31, 2015

(54) DEVICE FOR REDUCING NOISE FROM JET-PYLON INTERACTIONS ON JET ENGINES

(75) Inventors: Alain Dravet, Les Pennes Mirabeau (FR); Jacques Michel Albert Julliard, Hericy (FR); Pierre Philippe Marie Loheac, Brie Comte-Robert (FR)

(73) Assignee: SNECMA, Paris (FR)

( * ) Notice: Subject to any disclaimer, the term of this patent is extended or adjusted under 35 U.S.C. 154(b) by 43 days.

(21) Appl. No.: 13/581,050

(22) PCT Filed: Feb. 25, 2011

(86) PCT No.: PCT/FR2011/050399
§ 371 (c)(1),
(2), (4) Date: Oct. 15, 2012

(87) PCT Pub. No.: WO2011/104488
PCT Pub. Date: Sep. 1, 2011

(65) Prior Publication Data
US 2013/0032663 A1 Feb. 7, 2013

(30) Foreign Application Priority Data
Feb. 26, 2010 (FR) ..................... 10 51376

(51) Int. Cl.
B64B 1/24 (2006.01)
B64C 21/02 (2006.01)
B64C 7/02 (2006.01)
B64D 27/18 (2006.01)
F02K 1/34 (2006.01)

(52) U.S. Cl.
CPC . B64C 21/02 (2013.01); B64C 7/02 (2013.01); B64D 27/18 (2013.01); B64D 33/06 (2013.01); Y02T 50/166 (2013.01)
USPC .......................................... 244/54; 244/1 N

(58) Field of Classification Search
USPC .................................................... 244/1 N, 54
See application file for complete search history.

(56) References Cited

U.S. PATENT DOCUMENTS 3,101,920 A * 8/1963 Fradenburgh ................. 244/130
4,156,344 A * 5/1979 Cuthbertson et al. ........ 60/226.1
(Continued)

FOREIGN PATENT DOCUMENTS

EP 2 028 360 2/2009
FR 2 913 401 9/2008
(Continued)

OTHER PUBLICATIONS

International Search Report Issued Jun. 28, 2011 in PCT/FR11/50399 Filed Feb. 25, 2011.

*Primary Examiner* — Timothy D Collins
*Assistant Examiner* — Keith L Dixon
(74) *Attorney, Agent, or Firm* — Oblon, McClelland, Maier & Neustadt, L.L.P.

(57) ABSTRACT

An aircraft pylon for mounting a dual-flow or triple-flow jet engine, the pylon including an upper surface for connection to the aircraft, two side flanks, and a flange on the lower portion of the pylon. The pylon further includes at least one portion that extends downstream from the cold flow nozzle of the jet engine and lies in the cold flow and, on the portion thereof extending into the cold flow beyond the nozzle, at least one opening, positioned on one of the flanks of the pylon, by which an air stream is injected into or drawn from the gas flow that flows along the flanks of the pylon.

16 Claims, 3 Drawing Sheets

(56) References Cited

U.S. PATENT DOCUMENTS

| | | | |
|---|---|---|---|
| 4,419,045 A * | 12/1983 | Andre et al. | 415/119 |
| 4,917,336 A * | 4/1990 | Jacobs et al. | 244/207 |
| 5,156,353 A | 10/1992 | Gliebe et al. | |
| 7,802,752 B2 * | 9/2010 | Papamoschou | 244/1 N |
| 2008/0217468 A1 | 9/2008 | Fol | |
| 2009/0064658 A1 | 3/2009 | Beutin et al. | |

FOREIGN PATENT DOCUMENTS

| | | |
|---|---|---|
| GB | 2 138 507 | 10/1984 |
| GB | 2 203 710 | 10/1988 |

\* cited by examiner

DEVICE FOR REDUCING NOISE FROM JET-PYLON INTERACTIONS ON JET ENGINES

BACKGROUND OF THE INVENTION

1. Field of the Invention

The field of the present invention is that of civil aviation and, in particular, that of the noise generated by airplanes.

2. Description of the Related Art

The noise generated by commercial airplanes, particularly on takeoff, is a nuisance that is widely known and a great many innovations have been conceived in an attempt to reduce it. One of the main sources of this noise is from the jet of the engines, which are used at full power during the takeoff phase. Considerable work has obviously been carried out in an attempt to reduce the noise of the jet of the turbojet engine, for example the fitting of sawtooth chevrons to the exit nozzle, whether the exit nozzle for the hot gases which originate from the primary flow through the engine, or the one for the so-called cold gases which originate from the secondary or bypass flow of the engine.

In order to limit the nuisance to those living or working near airports, strict standards have been imposed that limit the noise that can be perceived at various points situated around the airplane, at various distances and in several directions from the takeoff runway.

One of the particularly critical aspects with which airplane designers have to comply, in terms of the maximum noise that is permissible if the airplane is to be certified, is in a lateral position with respect to the airplane, at a distance of 450 m from the takeoff runway. The presence of the pylon, i.e. of the strut that supports the engine by attaching it to the wing, generates locally, in the region where the gases are ejected, high levels of turbulence in the flow and this results in a very significant increase in the lateral noise of the engine. This phenomenon is particularly keenly felt in configurations in which the pylon protrudes beyond the plane in which the gases are ejected, which is becoming a configuration very often employed in recent commercial airplanes.

The results of numerical calculations or of measurements taken on models in a wind tunnel clearly show that the effects of interactions between the flow flowing around the pylon and the pylon itself generate an appreciable increase in the levels of turbulence and, as a result, in the noise level. A significant change to the angular development of the jet radially around the pylon can also be observed, and this tends to direct the jet from the turbojet engine around the pylon, towards the wing.

Moreover, experience gained demonstrates that the introduction of the pylon, in addition to its having an influence on the increase in noise level in a conventional ejection configuration, can also considerably reduce the effectiveness of other devices that have been installed for reducing the noise of the exhaust gases, such as chevrons or mixers fitted to the exit nozzles. The presence of the pylon also, from an aerodynamic standpoint, modifies the initial development of the jet and therefore its mixing and its acoustic signature.

Thus, in terms of acoustics, the presence of the pylon causes an increase in the ejection noise at the lateral certification point and this increase can vary between 2 and 3.5 EPNdB (Effective Perceived Noise, in decibels) depending on the engine cycle, the size of the pylon and the ejection geometries considered.

Devices, such as those described in patent applications FR 2913401 or GB 2138507 have been conceived in an attempt to control the circulation of air around a pylon supporting a turbomachine. They do not, however, deal with the noise generated on takeoff by the shearing of the velocity between the hot flow or flows and the cold flow of double-flow (bypass) or triple-flow turbojet engines and have no impact on solving the technical problem associated therewith.

BRIEF SUMMARY OF THE INVENTION

The need to reduce jet noise is a constant concern for engine manufacturers, the benefit to be had in reducing the noise at source, i.e. in acting on the local turbulent flows around and downstream of the pylon are clear. The noise reduction potential even seems, in the end analysis, to be greater than that afforded by the use of chevrons or microjets at the periphery of the exit nozzle.

It is an object of the present invention to overcome these disadvantages of the prior art by proposing a device for reducing the noise generated by an engine mounted on the pylon of an aircraft, and notably the noise associated with the interaction between the jet of the engine and the flow of the air around the pylon.

To this end, one subject of the invention is an aircraft pylon for supporting a double-flow or triple-flow turbojet engine, comprising an upper face for connection to the aircraft, two lateral flanks and a sole at its lower part, said pylon comprising at least one part extending downstream of the exit nozzle for the cold flow of said turbojet engine and swept by the cold flow, characterized in that it comprises, on its part that extends into the cold flow beyond said exit nozzle, at least one orifice positioned on one of the flanks of said pylon, by means of which orifice a jet of air is injected into, or drawn in from, the flow of gas flowing along its flanks.

Injecting a jet or taking in the flow of gas makes it possible to modify the flow around the pylon and thus, by directing this jet in a suitable direction, to reduce the formation of vortices between the engine and the pylon and thus reduce the wall noise associated with the presence of the pylon and the shearing of velocities between the cold flow and the air on the outside of the engine. It improves the flows along the flanks and the lower part of the pylon and thus reduces the overall turbulent intensity and therefore the noise laterally, while at the same time controlling the initial growth of the jet and therefore the mixing thereof.

In one embodiment, the orifice is fed by a tube connected to a scoop bleeding air from the cold flow of the turbojet engine.

In another embodiment, the orifice is fed by a tube connected to a tapping bleeding air downstream of a compressor of the turbojet engine. The choice between the first and second embodiments mentioned hereinabove depends on the intensity that the jet needs to have in order to reduce the formation of the contrarotating vortices generated on each side of the flanks of the pylon.

Advantageously, the air is injected at a pressure at least 15% higher than the total pressure of said gas flow. A microjet is thus produced that is moving more rapidly than the main flow, and this ensures that the device is highly effective by supplying enough energy to significantly modify the flow in this region and produce less noise, while at the same time minimizing the amount of flow that has to be injected.

For preference, the air is injected in a direction which, horizontally, at said orifice, makes an angle of between 30° and 90° with the axis of the flow of the gas flow surrounding the turbojet engine. This choice of angular range is justified by research into sufficient penetration of the microjet into the flow surrounding the turbojet engine without generating expensive aerodynamic losses.

For preference, the air is injected in a direction which, vertically, at said orifice, makes an angle of between +60° and −60° with the direction perpendicular to the flank of the pylon. As before, the choice of angular range is determined by the search for optimum effectiveness of the microjet device.

In one particular embodiment, the pylon comprises at least one orifice (8) positioned on that part of its flank that is situated outside of the cold flow of the turbojet engine. The injection of fluid through this orifice also seeks to reduce the turbulent intensity of the flows in this region outside the flow from the engine. This results in a cleaner airflow, which therefore generates less noise, and contributes to the mixing with the secondary or bypass flow.

For preference, the pylon comprises at least one orifice positioned on its sole. Injecting fluid through this orifice makes it possible to reduce the detrimental effect of the pylon in this region by reducing the turbulence while at the same time cooling this sensitive region. The injection of fluid in this region also makes it possible to control the initial development of the jet and improve its mixing by notably modifying the intensity of the sources of noise and their location and acoustic signatures.

In one particular embodiment the pylon further comprises a connecting fairing connecting one of its lateral flanks to the hot flow exit nozzle, and comprises at least one orifice positioned on said fairing.

The invention also relates to an aircraft comprising at least one pylon as described hereinabove.

BRIEF DESCRIPTION OF THE DRAWINGS

The invention will be better understood and further objects, details, features and advantages thereof will become more clearly apparent during the course of the detailed explanatory description which will follow of one embodiment of the invention which is given purely by way of illustrative and nonlimiting example, with reference to the attached schematic drawings.

In these drawings.

DETAILED DESCRIPTION OF THE INVENTION

Figure 1:
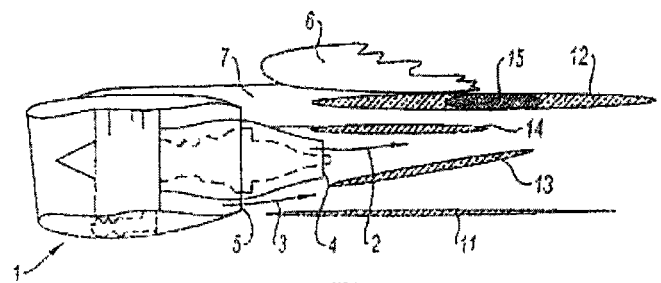
FIG. 1 is a view in cross section of a turbojet engine attached to a wing by a pylon according to the prior art.

Reference is made to FIG. 1 which shows an engine 1, of the dual-flow or bypass turbojet engine type, from which there are exhausted a primary flow or hot flow 2, and a secondary or bypass flow, also known as the cold flow 3. The hot flow leaves the engine 1 at a primary exit nozzle 4 whereas the cold flow leaves at a secondary exit nozzle 5. The engine 1 is attached to a wing 6 of an airplane (not depicted) by a supporting pylon 7. The pylon 7 is of substantially planar shape with an upper face for connecting to the airplane, two lateral flanks, here depicted as substantially vertical and mutually parallel, and a lower face or sole. Fairings 20, visible in FIG. 5, make the connection between the flanks of the pylon 7 and the top of the primary exit nozzle 4, so as to ensure a clean aerodynamic flow at the junction between these two elements. The pylon 7 runs longitudinally, i.e. in the direction in which the air flows around the engine, downstream of the exit plane of the exit nozzles 4 and 5 of the engine 1. It also extends downward through the external air flow and the cold flow 3 as far as the boundary formed by the hot flow 2, the purpose of this being to avoid damage caused by the substantial heat that the gases in this flow acquire. Its sole is, however, swept by the hot flow and subjected to high temperatures.

FIG. 1 depicts regions of turbulence, referenced from 11 to 15, which form in the flow from the engine, at the shearing of velocity between the various flows and which generate the jet noise of the engine. The regions 11 and 12 correspond to the region of mixing of the cold flow, at its lower part and its upper part respectively, with the flow of air surrounding the engine, while the regions 13 and 14 correspond to the regions of mixing of the cold and hot flows. The region 15 corresponds to particular turbulence created by the presence of the pylon 7, in the upper part of the cold flow; this turbulence, through the shearing of velocities it creates, causes noise, known as wall noise, that needs to be reduced as far as possible in order for the airplane to be certified for takeoff. It is precisely this that forms the subject of the invention.

Figure 2:
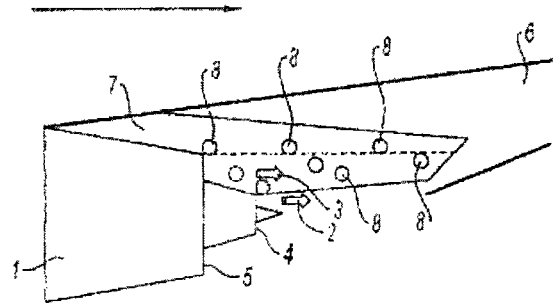
FIG. 2 is a schematic view of an afterbody of an engine carried by a pylon equipped with a device according to one embodiment of the invention.
Figure 3:
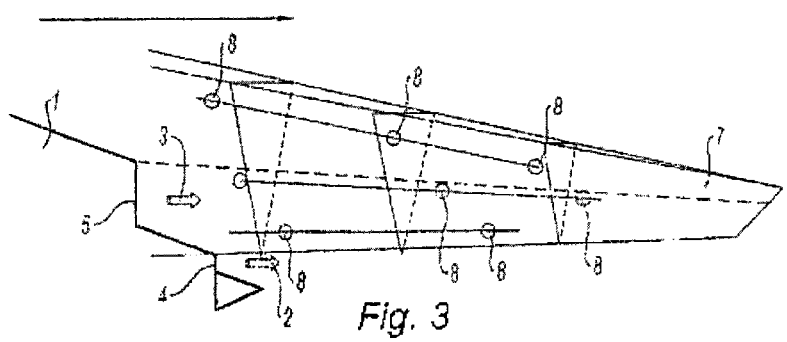
FIG. 3 is a more detailed schematic view of an afterbody of an engine supported by a pylon equipped with a device according to one embodiment of the invention.

Reference is now made to FIGS. 2 and 3 which show a pylon 7, attached to a wing 6 and positioned partially in the flow of external air and partially in the cold flow 3. Openings 8 are made in this pylon and positioned uniformly on the lateral flank of the pylon. Here, eight of such openings are depicted, aligned in three rows, a top row, a middle row and a bottom row, running more or less in the direction of the longest dimension of the pylon and which tend to cover all of the lateral surface of the pylon. The shape of these orifices 8 is depicted in the figures as cylindrical, but this is not essential. They are, moreover, depicted in FIGS. 2 and 3 as being present on the only visible face of the pylon 7; obviously, similar orifices are present on the other flank of the pylon in order to take account of the turbulence created by this other flank in the hot flow 2 and the cold flow 3.

Figure 4:
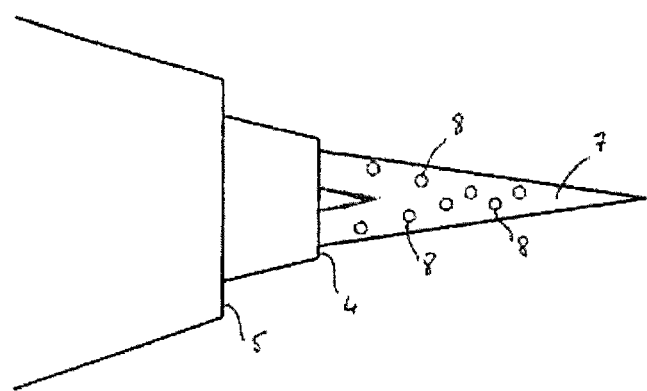
FIG. 4 is a view from beneath of the afterbody of FIG. 2.

FIG. 4 shows, in a view from beneath, the pylon 7 extending downstream of the exit nozzle 4, and its part, or sole, situated underneath the pylon and swept by the hot flow 2. This sole likewise is pierced with orifices 8 similar to those made in the flanks of the pylon.

Figure 5:
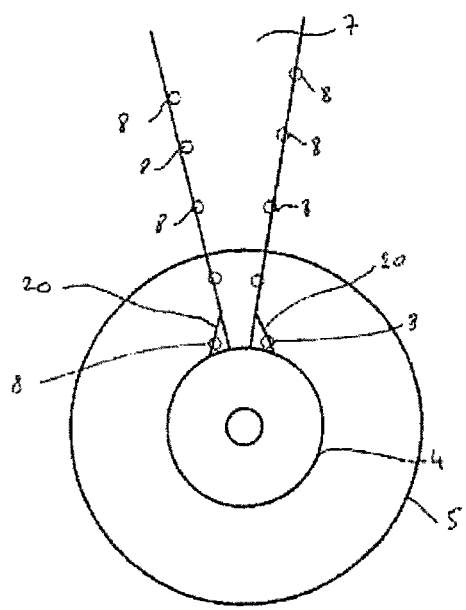
FIG. 5 is a view from the rear of the afterbody of FIG. 2, in cross section on the outlet plane of the cold flow exit nozzle.

FIG. 5 shows, in cross section at the outlet from the secondary exit nozzle, the connection between the flanks of the pylon 7 and the primary exit nozzle 4. Two connecting fairings 20 ensure a clean aerodynamic flow between these two elements which are likewise pierced with orifices 8, just like the flanks or the sole of the pylon.

Figure 6:
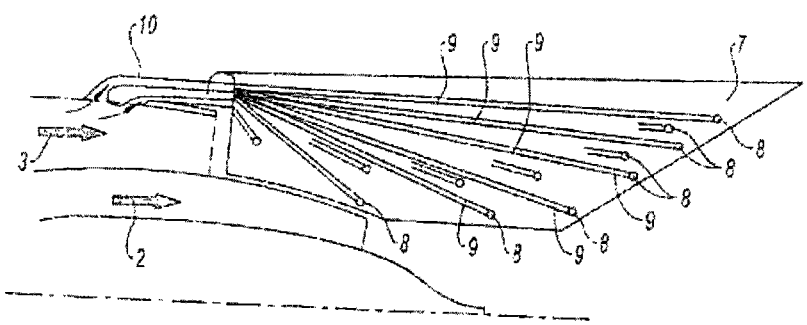
FIG. 6 is a schematic view of a first embodiment of the system for feeding air to a pylon equipped with a device according to the invention.
Figure 7:
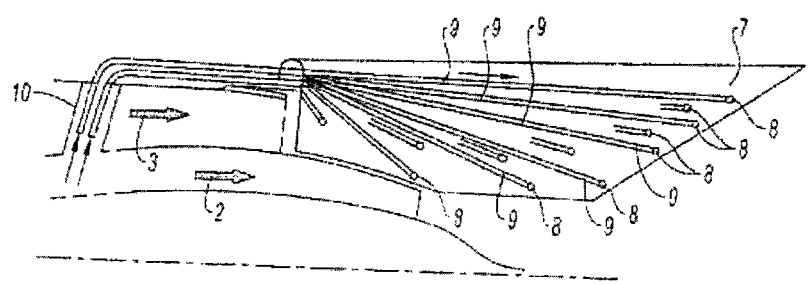
FIG. 7 is a schematic view of a second embodiment of the system for feeding air to a pylon equipped with a device according to the invention.

FIGS. 6 and 7 show two versions of the system for feeding these orifices 8 with pressurized air. In both alternatives, tubes 9, the diameter of which corresponds to that of the orifices 8, run along inside the pylon 7 between an air collector 10 and the orifices 8. In the first alternative form of the invention, depicted in FIG. 6, the collector 10 is a scoop which bleeds air from the secondary or bypass flow, whereas in the second alternative form depicted in FIG. 7 it consists of a compressed-air tapping made on the high-pressure compressor of the engine, which makes it possible, if necessary, to supply higher pressures than in the first alternative form.

It is commonly found that there are 2 contrarotating vortices generated on the flanks of the pylon. These are, as mentioned earlier, very penalizing in terms of laterally perceived noise, because they increase the turbulence at and downstream of the pylon. This increase is connected with the presence of the pylon which generates the two swirling flows mentioned above.

In order to make it possible to reduce the turbulence by reducing the layers of shear and improving the mixing of the flows in this region, the invention proposes to distribute jets over the flanks and/or the base of the pylon 7, in order to gain better control over and to check the turbulent flows and flow/pylon interactions in this sensitive region. These jets are distributed, in the cold flow and the stream of air surrounding the engine, in several rows parallel to the mean flow, and at various heights, with angles of incidence of injection which are dependent on the aerodynamics of the jet. The novel idea is thus that of obtaining a reduction in exhaust noise from the power plant by influencing the flow around the pylon by installing fluid injection devices capable, via continuous or pulsed jets, of influencing the levels of turbulence in order to dissipate this turbulence without generating any real aerodynamic losses.

The in-built fluidic devices proposed by the invention are preferably air injection orifices 8 but may, as an alternative, be intake orifices or, more generally, any device capable of modifying the flow around the pylon 7. These jets are routed through the pylon via the tubes 9 and fed, for example, from a collector 10 incorporated into the upstream part of the pylon 7. The tubes 9, by injecting jets onto the flanks of the pylon, allow a beneficial modification to the unsteady flows by reducing the contrarotating vortices, making it easier for the flows in this region of great turbulence to mix and therefore significantly reducing the engine jet noise perceived laterally.

There are two conceivable solutions for supplying air to the collector 10 that feeds the jets: either air is picked up by a scoop from the secondary or bypass flow as depicted in FIG. 6, or it is bled, at a tapping, from the primary flow compressor, as depicted in FIG. 7, making the bled air flow for example through one of the structural arms which is hollow. The choice between these two alternatives will depend on the flow rate and pressure required for the jet exiting the orifices 8.

The orifices 8 have dimensions which are dependent on the size of the pylon but which, for the most commonplace applications, do not, each, exceed a size of 4 cm$^2$, the reason for this being to avoid generating parasitic noise in the medium frequencies; by contrast, their size is at least 1 cm$^2$ in order to be suitably effective. If their shape is not circular, then the ratio between the transverse dimensions of these openings should preferably not exceed a value of three.

The preferred technical features of the injected jet are described below:
  in terms of the jet injection pressure it is preferable to have a pressure which is at least 15% higher than the pressure of the flow into which it is injected. Bearing in mind the fact that the injection region is limited to that part of the pylon 7 that is situated downstream of the engine nozzles, the total flow rate injected remains relatively low by comparison with the engine flow rate and is generally less than 0.2% of the flow rate of the secondary or bypass flow. The impact that bleeding this air has on takeoff thrust therefore remains very limited and perfectly acceptable.
  because the temperature of the jets does not appear to be very critical, the air bled from the engine can, in this respect, be bled just as well from the cold region, in the secondary or bypass stream, as it can from the HP compressor.
  the tubes 9 that feed the jets, which run inside the pylon 7 as far as the outlet orifices 8, are directed, depending on the configuration of the pylon 7, in a direction which varies horizontally from 30° to 90° with respect to the axis of the stream of air surrounding the engine and vertically from +60° to −60° with respect to the normal to the flanks of the pylon. This choice of angular ranges is justified by a need for the microjets to penetrate the main flow without, however, generating excessive aerodynamic losses, and this is what excludes angles of incidence greater than 90° with injections in a direction that is opposite to the flows that produce the thrust.

The way in which the orifices 8 are installed on the pylon 7 along the top, middle and bottom rows, is preferably as follows:

The bottom row, situated at the base of the pylon, comprises at least two orifices 8 on each flank of the pylon 7. The orientation of the injections is toward the base of the pylon so as to act on the shear layer of the mixture of hot flow 2 with cold flow 3.

The middle row, which is situated approximately mid-way up, on that part of the pylon that is swept by the secondary or bypass flow 3, comprises at least three orifices 8 on each flank of the pylon 7. Injection is horizontally in the direction of the mean flow and vertically in the angular range defined hereinabove.

The top row, which is situated on the upper part of the pylon 7, outside of the flows from the engine but near the region of shear between the secondary or bypass flow 3 and the external air comprises at least three orifices 8 uniformly distributed along the length of that part of the pylon that is situated downstream of the exit nozzle. The injection is oriented toward the base of the jet with a horizontal orientation as defined hereinabove.

The purpose of these orifices is to make it possible, through an injection of fluid, to influence the unsteady component of the main flows and notably the turbulent flows in the region of the boundary layer; they more generally act on the generation of vortices by decorrelating, for example, the large vortex structures generated in the region of the pylon, which in this region generate a significant contribution to the additional noise radiating laterally.

There are also orifices 8, preferably four of them, situated at the base of the pylon on its sole, as illustrated in FIG. 4. These orifices are arranged on the sole either in a straight line or in a staggered configuration; they are oriented axially in the direction of the flow and transversely in the angular range defined hereinabove. The benefit of these orifices is, aside from their contribution toward reducing the noise, that they supply air at a relatively low temperature to cool the sole of the pylon which is swept by the gases of the hot flow.

There are also orifices 8 on the nozzle fairings 20 ensuring a clean aerodynamic flow between the flanks of the pylon and the top of the primary exit nozzle, as illustrated in FIG. 7.

In conclusion, the invention provides a simple solution to reducing the noise level of an airplane on takeoff, which is more effective and does not require complex installation like the solutions based on jets installed at the periphery of the nozzle. This device moreover has the advantage of being a device which is termed an active device, i.e. a device that can be brought into operation on demand. In theory, it is brought into operation only during the takeoff phase and is deactivated for cruising flight, thus avoiding potential drops in performance and increases in specific fuel consumption.

Finally, such a device, by acting to reduce the interactions between the flows of gas and the pylon, also acts on the root cause of certain additional noises, which do not originate as a result of the shearing of the jets and which are amplified by the presence of the wing structure and the high-lift systems. It therefore plays a very effective part in improving the overall aero-acoustic performance of the airplane.

Although the invention has been described in conjunction with one particular embodiment, it is quite obvious that it encompasses all technical equivalents of the means described and combinations thereof where these fall within the scope of the invention. In particular, the description has been made with reference to a bypass turbojet engine, the pylon comprising one part which is swept by the cold flow of the turbojet engine and another swept by the flow of air external to the engine. The invention can also be applied to a pylon carrying a triple-flow turbojet engine, one part of which is swept by the cold flow thereof, the primary and secondary hot flows being discharged underneath the sole of this pylon.

The invention claimed is:

1. An aircraft pylon for supporting a turbojet engine that ejects a gas flow including a primary flow from a primary exit nozzle and a secondary flow from a secondary exit nozzle located radially outwardly with respect to the primary exit nozzle in a plane normal to a flow direction of the primary flow, thereby forming an inner shear layer at a boundary between the primary flow and the secondary flow, and an outer shear layer at a boundary between the secondary flow and a surrounding air flow that surrounds the secondary flow, the pylon comprising:

an upper face for connection to the aircraft;
a base including a portion for connection to the engine and a sole; and
two lateral flanks connecting the upper face to the base, the pylon extending radially into the primary flow, the secondary flow, and the surrounding air flow, and extending longitudinally downstream of the primary exit nozzle,
the sole including a part swept by the primary flow, and each of the two lateral flanks including
a part swept by the secondary flow,
a part swept by the surrounding air flow,
a bottom row including at least two orifices, by each of which orifices a jet of air is injected into, or drawn in from, the flow of gas flowing along the lateral flank, each of the orifices of the bottom row having an injection direction toward the inner shear layer, at least one orifice of the bottom row being located downstream of the primary exit nozzle,
a top row including at least three orifices, by each of which orifices a jet of air is injected into, or drawn in from, the flow of gas flowing along the lateral flank, each of the orifices of the top row having an injection direction toward the outer shear layer, each of the orifices of the top row being located on the part swept by the surrounding airflow, at least one orifice of the top row being located downstream of the primary exit nozzle, and
a middle row located between the bottom row and the top row and on the part swept by the secondary flow, the middle row including at least three orifices, by each of which orifices a jet of air is injected into, or drawn in from, the flow of gas flowing along the lateral flank, each of the orifices of the middle row having an injection direction toward a mean flow of the gas flow, at least one orifice of the middle row being located downstream of the primary exit nozzle.

2. The pylon as claimed in claim 1, in which at least one orifice is fed by a tube connected to a scoop bleeding air from the cold flow of the turbojet engine.

3. The pylon as claimed in claim 1, in which at least one orifice is fed by a tube connected to a tapping bleeding air downstream of a compressor of the turbojet engine.

4. The pylon as claimed in claim 1, in which the air is injected at a pressure at least 15% higher than total pressure of the gas flow.

5. The pylon as claimed in claim 1, in which an air injection direction, horizontally, at least one orifice, makes an angle of between 30° and 90° with the flow direction of flow of the gas flow surrounding the turbojet engine.

6. The pylon as claimed in claim 1, in which an air injected direction, vertically, at least one orifice, makes an angle of between +60° and −60° with a direction perpendicular to the lateral flank of the pylon.

7. The pylon as claimed in claim 1, further comprising at least one orifice positioned on the sole.

8. The pylon as claimed in claim 1, further comprising a connecting fairing connecting one of the two lateral flanks to the primary exit nozzle, and at least one orifice positioned on the fairing.

9. An aircraft comprising at least one pylon as claimed in claim 1.

10. The pylon as claimed in claim 1, in which the bottom row of each of the two lateral flanks is located near the inner boundary layer, between the sole and the part swept by the secondary flow.

11. The pylon as claimed in claim 1, in which the bottom row of each of the two lateral flanks is located on the part swept by the secondary flow.

12. The pylon as claimed in claim 1, in which the injection direction of each of the at least two orifices in the bottom row is toward the base of the pylon.

13. The pylon as claimed in claim 1, in which the injection direction of each of the at least three orifices in the top row is toward the base of the jet and at an angle of between 30° and 90° with respect to the flow direction of the primary flow in a plane perpendicular to the lateral flank.

14. The pylon as claimed in claim 1, in which the injection direction of each of the at least three orifices in the middle row is in the direction of the mean flow in a plane parallel to the flow direction of the primary flow and perpendicular to the lateral flank and at an angle of between +60° and −60° in a plane perpendicular to the lateral flank and perpendicular to the flow direction of the primary flow.

15. The pylon as claimed in claim 1, further comprising at least four orifices arranged in a staggered configuration on the sole.

16. The pylon as claimed in claim 1, wherein the orifices in each of the rows are spaced substantially uniformly along substantially the length of the pylon downstream of at least one of the primary exit nozzle or the secondary exit nozzle.

* * * * *